(12) United States Patent
Stumm et al.

(10) Patent No.: US 7,862,063 B2
(45) Date of Patent: Jan. 4, 2011

(54) BICYCLE FRAME COMPOSED WITH CONVOLUTED CURVES

(76) Inventors: Maria Susan Stumm, 27 Melissa Ct., Hampton, VA (US) 23669; Robert Ernest Stumm, 27 Melissa Ct., Hampton, VA (US) 23669

( * ) Notice: Subject to any disclaimer, the term of this patent is extended or adjusted under 35 U.S.C. 154(b) by 722 days.

(21) Appl. No.: 11/593,943

(22) Filed: Nov. 8, 2006

(65) Prior Publication Data

US 2007/0145710 A1  Jun. 28, 2007

Related U.S. Application Data

(60) Provisional application No. 60/742,167, filed on Dec. 5, 2005.

(51) Int. Cl.
*B62K 19/04* (2006.01)
(52) U.S. Cl. ..................................... 280/283
(58) Field of Classification Search .............. 280/283, 280/275, 284, 285, 286
See application file for complete search history.

(56) References Cited

U.S. PATENT DOCUMENTS

| | | | | |
|---|---|---|---|---|
| 579,042 A | * | 3/1897 | Clark | 280/283 |
| 593,046 A | * | 11/1897 | Dahl | 280/283 |
| 701,967 A | * | 6/1902 | Titus | 280/283 |
| 4,669,747 A | * | 6/1987 | Groendal | 280/283 |
| 4,792,150 A | * | 12/1988 | Groendal et al. | 280/275 |
| 5,080,384 A | * | 1/1992 | Groendal et al. | 280/275 |
| 5,330,219 A | * | 7/1994 | Groendal et al. | 280/275 |
| 5,498,013 A | * | 3/1996 | Hwang | 280/283 |

* cited by examiner

*Primary Examiner*—Kevin Hurley

(57) ABSTRACT

The invention is a frame for a bicycle or other two wheeled vehicle that utilizes convoluted curves in its structure providing function in utility and manufacture as described here with this disclosure, as well as ornamental form as described by the subject complementing disclosure by design patent application No. 29/243,986. The specific utility that is offered by this invention is a suspension quality inherent to the frame itself. The frame serves as a suspension system isolating the vehicle rider from the displacements of the vehicle wheels forced by the irregularities that may exist in a road over which the vehicle may travel. A specific quality of manufacture offered by this invention is a frame that avoids the necessity of tube and tube joints, and likewise an otherwise necessary welding or fusion of such tube joints.

1 Claim, 2 Drawing Sheets

Figure 4:
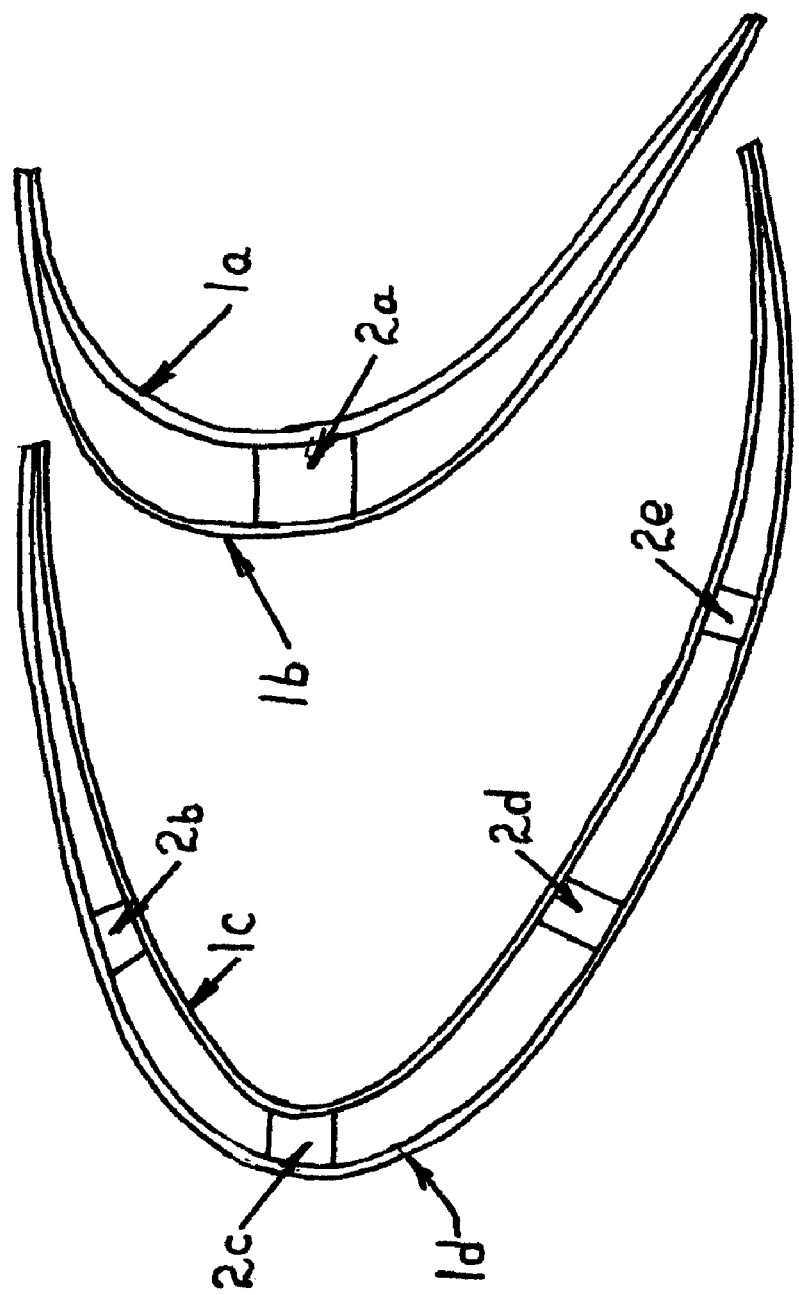

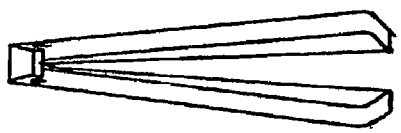
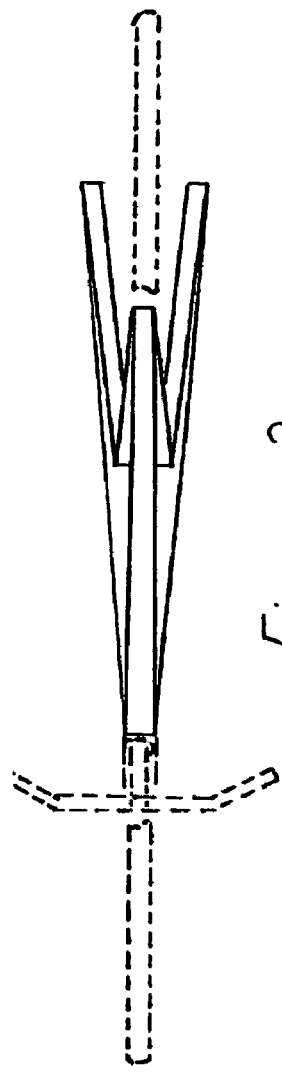
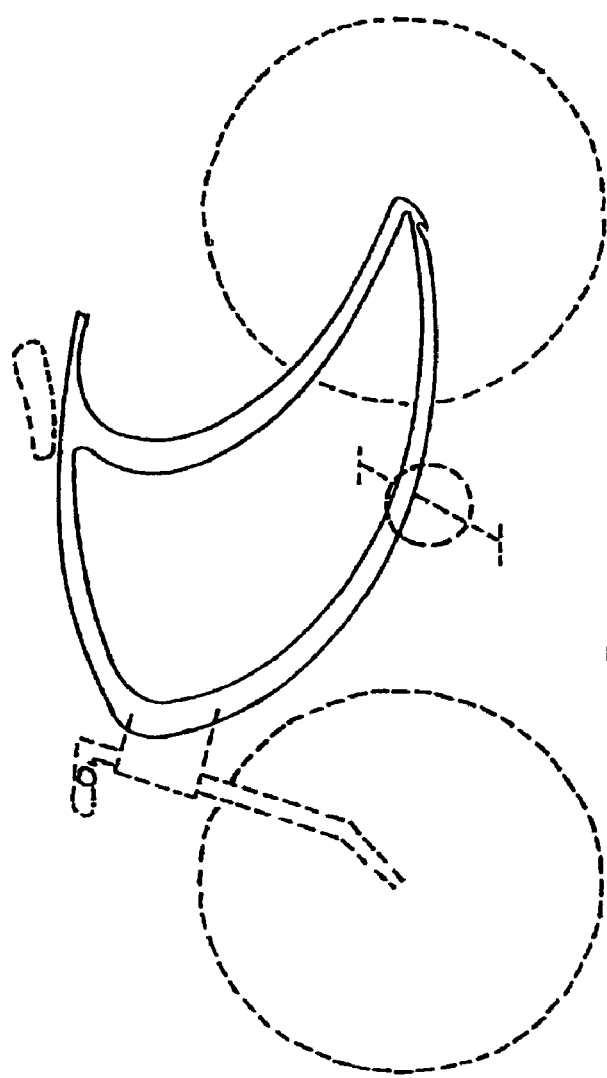
Figure 2
Figure 3
Figure 1

BICYCLE FRAME COMPOSED WITH CONVOLUTED CURVES

CROSS REFERENCE TO RELATED APPLICATIONS

The following applications relate to the invention claimed herein:
Provisional Patent, Application No. 60/742,167; Bicycle3 Frame Composed with Convoluted Curves, Filed Dec. 5, 2005 by Maria Stumm et. al.
Design patent, application No. 29/243,986, Group Number2911, Filed Dec. 5, 2005 by Maria Stumm et. al. Examiner: Linda Brooks.

The invention claimed herein was first disclosed by the cited patent applications. The cited provisional patent discloses the utility offered by the art like that of the ornamental form disclosed by the cited design patent application.

STATEMENT REGARDING FEDERALLY SPONSORED RESEARCH

This invention has been developed independent of any federally sponsored research or development.

NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable

BACKGROUND OF THE INVENTION (1) Field of the Invention

Much prior art exists that aims at reducing the vibrations of a bicycle and its rider caused by traversing over road irregularities. Mitigating vibrations induced by the road permits faster travelling speed and reduces material fatigue in addition to providing for rider comfort. This mitigation is hence fundamental to smart bicycle design.

On racing type road bicycles intended for use on smooth road surfaces where major pavement irregularities do not much exist, isolation from road vibrations is significantly provided for by gel or foam within the rider's clothing. These bicycles may also incorporate carbon fiber as a damping material in their front wheel forks and in all or part of their frames that also absorb road vibrations. Curved seat stays are sometimes incorporated into the bicycle frame to provide further vibration absorbing flexibility. The amount of road irregularity that may be absorbed by the means just described is limited to those of relatively high frequency and small amplitude. This limitation not withstanding as they are meant to be ridden on smooth roads, racing type road bicycles are fitted with light, small tube diameter, and hard highly pressurized tires for minimum rotating inertia and minimum rolling resistance to achieve high speed. Bicycles intended for somewhat more irregular than smooth road surfaces are often fitted with heavier, larger tube diameter, and softer less pressurized tires to absorb the greater road vibrations.

(2) Description of Related Art

Lund in U.S. Pat. No. 6,702,399 describes an open ended cylindrical shock absorber housing mounted concentrically within a wheel hub for absorbing road vibrations at the wheels.

The ability to absorb vibrations of lower frequency and greater amplitude by these means about the wheels comes at the expense of greater rotating inertia and rolling resistance. Vehicle speed is compromised.

Road vibration transmission to the rider is also addressed with various types of seat suspensions as exemplified:
Wang in U.S. Pat. No. 6,176,476 describes a suspension seat post.
Sinyard in U.S. Pat. No. 6,848,701 describes a bicycle seat post assembly having a cavity in which vibration dampening material is placed.
Allsop in U.S. Pat. No. 5,415,423 describes a bicycle seat suspended off a cantilever beam used a spring to provide the vibration isolating effect.

These means effectively isolate the majority of the weight in travel which exists as the vehicle rider himself. The bicycle may be fitted with respective lighter, smaller tube diameter and harder higher pressure tires to achieve faster speeds. Vibration isolation at the seat post however does not provide isolation to the bicycle itself which resides below the seat post. The bicycle and also a portion of the rider through his legs are still subjected to the stress of road vibration. Also, quality seat posts that can effectively absorb low frequency higher amplitude vibrations can be complex in manufacture and costly to assemble.

Suspension systems utilizing coiled springs and shock absorber components are incorporated into bicycles such as of the mountain bike type to accommodate the low frequency high amplitude deflections that are found in off road terrain:
Schmider in U.S. Pat. No. 7,104,562 describes a rear wheel suspension for a bicycle having a swing arm holding the rear wheel with a shock absorbing element connected between the swing arm and the frame.
Soucek in U.S. Pat. No. 7,066,481 describes a bicycle rear suspension with pivoting upper and lower links connected to both a front frame and a rear frame member with a shock absorber providing the vibration damping effect.
Chamberlin in U.S. Pat. No. 7,059,620 describes a bicycle frame assembly composed of a main frame and a sub frame with a shock absorber in between.

These are examples of bicycle designs of the type incorporating what is commonly known as active suspension systems. Such active suspension systems dictate heavy and complex bicycle frame designs. Their use is usually intended for rough terrain where speed like of a road bike is not expected.

Art exists that incorporates significant spring and dampening qualities into the bicycle frame itself:
Raco in U.S. Pat. No. 6,659,4877? Describes a flexible bike frame that uses a shock absorber as a frame member and a plurality of flexible joints throughout the remainder of the frame.
Castellano in U.S. Pat. No. 6,406,048 describes a pivotless rear suspension system for bicycles utilizing a planer truss chain stay member with a wide lateral side and a thin vertical side so as to be laterally rigid and vertically flexible in conjunction with a seat stay member composed with a shock absorber.

Art also exists that moves away from the use of active shock absorber component by integrating spring and damping qualities directly into the passive members of the frame:
Kirk in U.S. Pat. No. 6,109,637 moves away from active shock absorber components by describing an elastomeric damper affixed to well curved seat stays for enhanced vibration absorption.

Schober in U.S. Design patent D520411 displays an ornamental bicycle suspension member that replaces the chain and seat of a common bicycle frame with a one piece formed chain and seat stay member that can be made of flexible plastic material.

Peraz in U.S. Pat. No. 6,932,371 describes a bicycle frame with a rear passive suspension configured to elastically deflect in the vertical direction while maintaining rigidity in other directions. The frame utilizes a pair of upper chain stays that control rear wheel motion while removing the seat stays found on common bicycles.

Buckland in U.S. Pat. No. 1,114,855 discloses a bicycle frame consisting of two pairs of parallel springs pivotally connected to opposite sides of the front steering head. He describes a set of spring strips starting at the bicycle's steering head that curves down to the axle of the rear wheel to which a seat post and pedals are attached.

Jenick in U.S. Pat. No. 2,264,981 discloses a bicycle having a frame substantially in the form of a parallelogram like that of a common road bike with members of the frame being metal spring strips held in place with spacers Art of this type appears for bicycles envisioned to absorb road vibrations greater than afforded by those of the road racing type albeit not as great as that of bicycles with active suspension systems designed for off road terrain. The vibrations desired to be absorbed appear of the frequency and amplitude encountered when traversing many city streets. The limitation that exist in this type of art comes from the materials of the frame members, but also from the frame member's length as dictated by common bicycle frame forms.

BRIEF SUMMARY OF THE INVENTION

The present invention pertains to the type of art that integrates spring and damping qualities directly into the bicycle frame itself. Like the prior art of this type described, the invention moves away from the use of active shock absorber components and does include features found in the prior art like that of using an arrangement of parallel spring strips such as found in the inventions of Buckland or Jenick, but overcomes the limits of the prior art, distinguishes itself from the prior art in general, and distinguishes itself from the patents referenced in particular, by making the entire frame an active spring manifested as an elegant novel form of convoluted curves that have substantially more length than frame members of bicycle forms of the prior art. The result is greater frame flexibility and thus a greater ability to absorb road vibrations of lower frequency and greater amplitude. Bicycles incorporating the present invention may be fitted with lighter, smaller tube diameter, and harder higher pressure tires allowing for faster practical speeds in city commutes.

The present invention also offers application to two wheeled motorized vehicles like mopeds and motorcycles in that an engine can easily be situated within the form. Hence, the present invention is referred to as being a two wheeled vehicle frame.

The invention is a frame for a bicycle or other two wheeled vehicle that utilizes convoluted curves in its structure providing function in utility and manufacture as described here with this disclosure, as well as ornamental form as described by the subject complementing disclosure by design patent application No. 29/243,986. The specific utility that is offered by this invention is a suspension quality inherent to the frame itself. The frame serves as a suspension system isolating the vehicle rider from the displacements of the vehicle wheels forced by the irregularities that may exist in a road over which the vehicle may travel. The specific quality of manufacture offered by this invention is a frame that avoids the necessity of tubes and tube joints, and likewise the otherwise necessary welding or fusion of such tube joints.

BRIEF DESCRIPTION OF THE SEVERAL VIEWS OF THE DRAWINGS (1) The design of the frame is shown as the embodiment as FIGS. 1 through 3. FIGS. 1 through 3 present an arrangement of curved frame members convoluting upon one another to form a frame having a spring quality also configured to hold bicycle or other vehicle components, like seat, wheel forks, handlebar arrangement for steering, and pedal crank. The vehicle components are shown in broken lines on the figures and do not form part of the claimed invention.

(2) The basic convoluted curve design is made as two frame halves that are then brought together to from a total frame. The vehicle components are shown in broken lines on the figures and do not form part of the claimed invention.

(3) FIG. 1 is a left hand elevation of the embodiment.

(4) FIG. 2 is a back elevation of the embodiment.

(5) FIG. 3 is a top elevation of the embodiment.

(6) FIG. 4 shows components of spring material strips and binding spacers arranged in a set of fore and aft convoluted curves that when all brought together make the claimed invention.

DETAILED DESCRIPTION OF THE INVENTION (7) The invention is a frame for a bicycle or other two wheeled vehicle that utilizes convoluted curves in its structure providing function in utility and manufacture described here with this disclosure as well as ornamental form as described by the subject disclosure for a design patent application. The invention distinguishes itself from prior art by its frame in its entirety being an active spring manifested as an elegant novel form of convoluted curves that have substantially more length than frame members of bicycle forms of the prior art providing spring and vibration damping quality.

(8) The embodiments shown by the respective drawings, the frame consists of curved strips of metal, or composite material that together produce a suspension effect. The curves have generally large radii, and thus the frame may be analyzed as an arrangement of cantilever beams to establish the frame's stress and deflection characteristics. The curved strips of metal or composite material are grouped and bound together like shown in FIG. 4 to increase inertia and thus stiffness of the frame. As an example, in FIG. 4, parts (1a), (1b), (1c), & (1d) are spring material strips and parts (2a), (2b), (2c), (2d), & (2e) are spacers that tie the strips together. The volume between the spring strips may be filled with a binding plastic material. The plastic material serves to dampen the spring effect to the frame as well as acting as a separator between the spring strips with or without the spacers. By adjusting the size and placement of the spacers thus changing the frame's inertia, stiffness, or geometric proportions, the frame may be tuned to the rider's weight and physique.

(9) With the flexing of the frame when forming part of a bicycle, the relative distance from where the pedal sprocket is attached to where the rear wheel is attached changes. Tension on the chain running across the pedal sprocket and the sprocket of the rear wheel is maintained while the frame flexes by a derailleur system on the rear wheel.

(10) The frame may be constructed using strips of suitable steel, aluminum, or composite material. The frame hence is not constructed of tubing, and thus has no tubular joints. Welding or fusion of tubular joints otherwise commonly done in bicycle frame construction is avoided. Manufacture is thus simplified. The frame can be substantially be assembled with fasteners.

(11) The frame may also be constructed of a composite material, and thus can be formed by pouring or injecting the material into a mold.

What is claimed is:

1. A two wheeled vehicle frame comprised of a number of metal or composite material strips shaped and arranged to form a frame to which a vehicle rider's seat, a steering fork for steering that holds a front wheel, an axle for a rear wheel, and a pedal crank in the case for a bicycle can be attached by means of bolting and interface brackets, forms a frame for a two wheeled vehicle as wherein the improvement over prior art comprises of the material strips being shaped generally along the lines of a set of crescents with;

a. a first set of material strips beginning at or just behind the location for the rider's seat, continuing on forward in one sweeping and continuous curve to the location of the vehicle's steering fork, continuing on now bending backward around to the location of the pedal crank for a bicycle, and continuing on back to terminate at the location for the axle of the rear wheel, b. a second set of material strips curved inside the first set of material strips, in other words convoluted to the first set, beginning near the same location of where the first set of material strips begin, that being at or behind the location of the rider's seat, continuing on forward but curving in a tighter radius than that of the first material strip set, then bending back directly toward the axle of the rear wheel bypassing the front fork and pedal crank locations, where at the rear wheel axle location the material strips terminate essentially at the same location as the first set of material strips, c. both the first and second sets of material strips are longitudinally split as they bend backward toward the rear wheel axle, into right and left halves, and are expanded apart so as to permit clearance between the split portions for accommodating the rear wheel; the arrangement of material strips with such arrangement having an inherent spring quality providing a suspension effect for a bicycle or two wheeled vehicle.

* * * * *